June 20, 1939. G. A. LYON 2,162,735
METHOD OF MAKING A WHEEL
Original Filed July 20, 1936   3 Sheets-Sheet 3
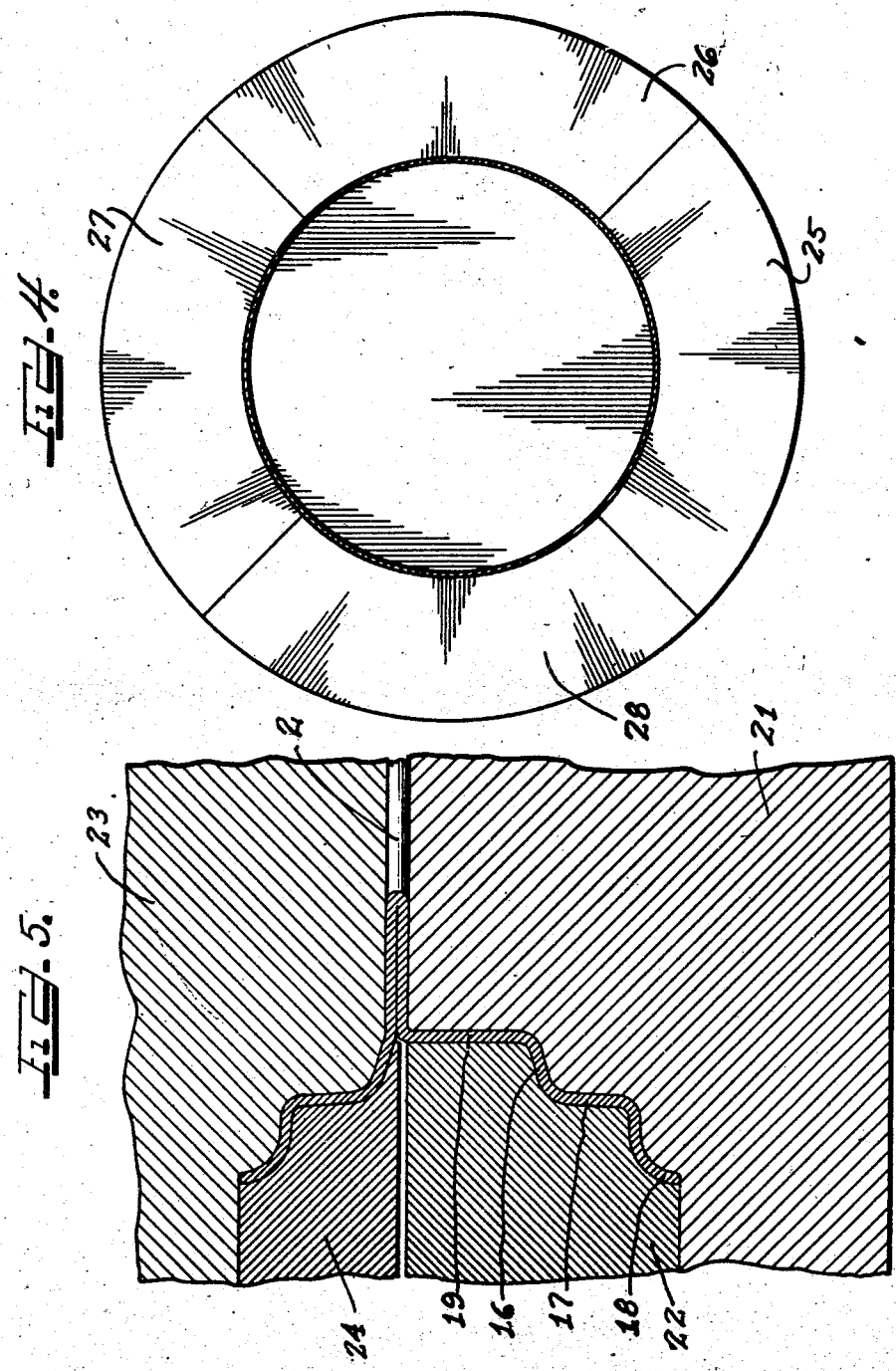
Inventor
GEORGE ALBERT LYON.
by Charles W. Hills
Attys.

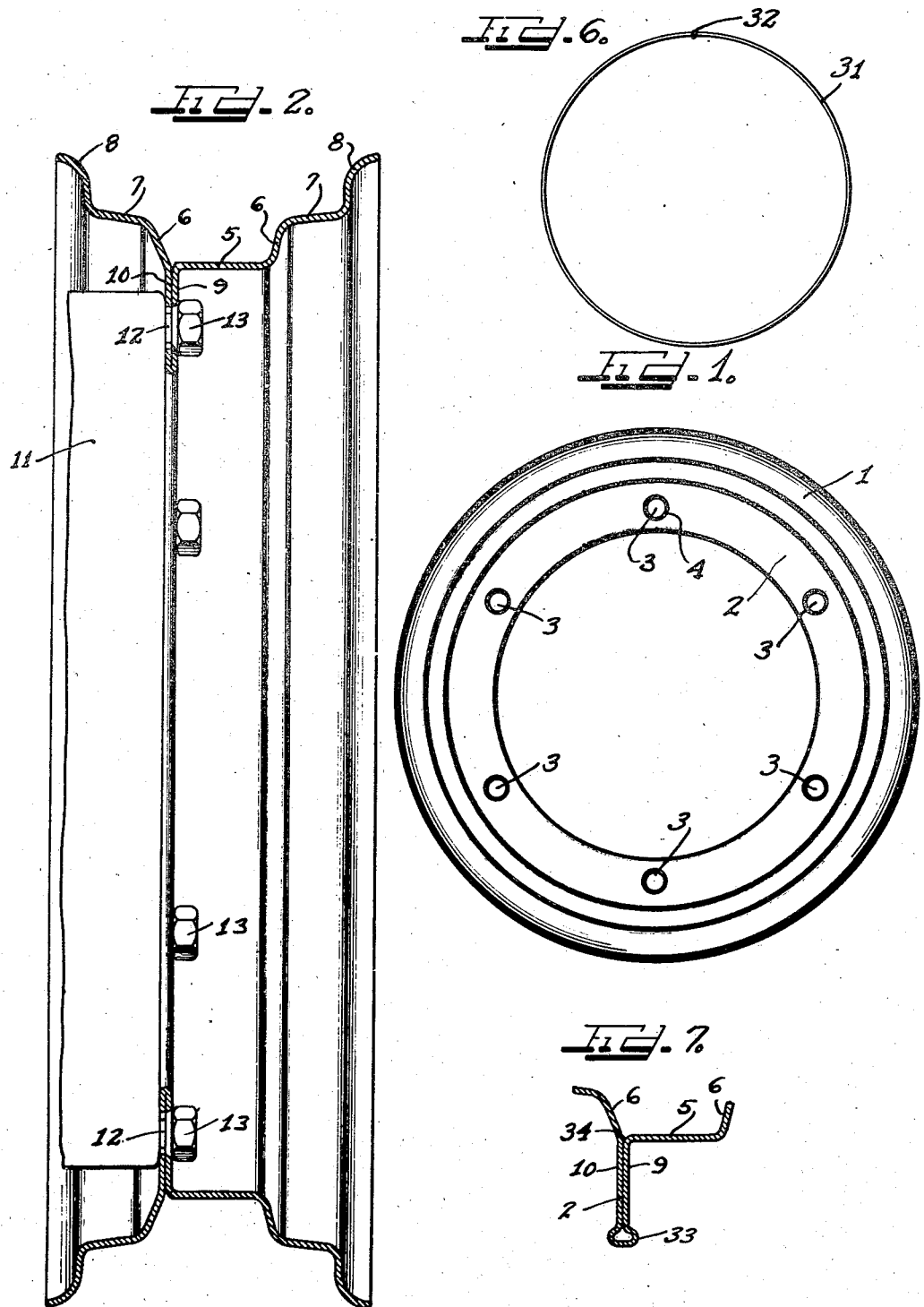

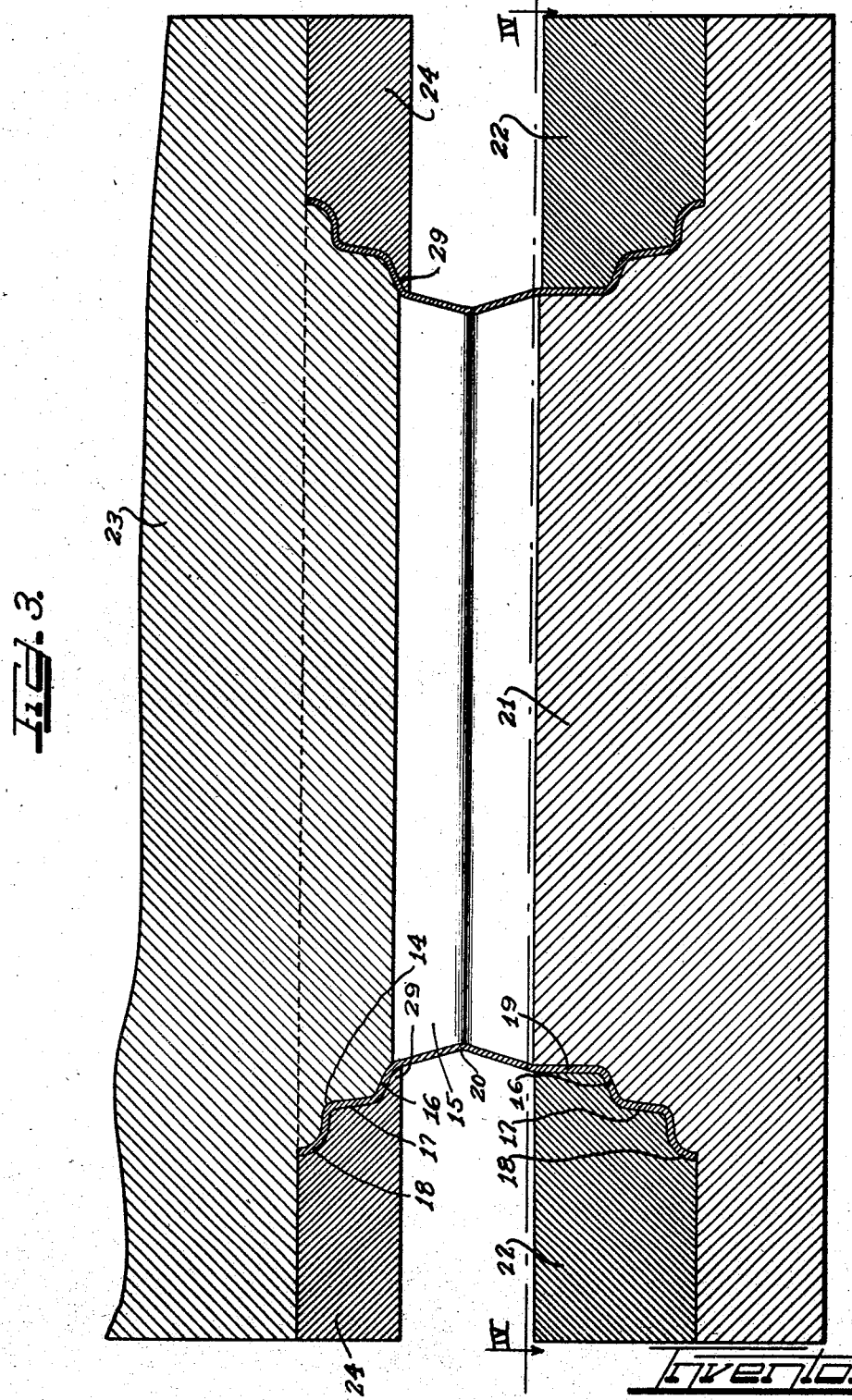

Patented June 20, 1939

2,162,735

UNITED STATES PATENT OFFICE 2,162,735

METHOD OF MAKING A WHEEL

George Albert Lyon, Allenhurst, N. J.

Application July 20, 1936, Serial No. 91,563
Renewed November 9, 1938

3 Claims. (Cl. 29—159.01)

This invention relates to a method of making wheels and more particularly to a method of fabricating vehicle wheels which comprises a rim which may be connected directly to the usual wheel supporting element.

During the early stages of development of the wheel manufacturing industry, the usual wheel included three cardinal elements, namely, a rim element, a body element, and a hub element. At a much later stage, the hub element was eliminated by designing the body part of the wheel in such a manner as would facilitate its direct connection to the wheel supporting element (such, for example as the brake drum of an automobile). The resulting economy in manufacturing costs was manifest. It is an object of this invention to still further reduce manufacturing costs by providing a novel method of manufacturing a wheel of a type which no longer requires the conventional body part.

Another object of this invention is to provide a novel process of making a wheel having a rim part and a fastening flange from a single sheet of material.

A further object of this invention is to provide a novel process for making a wheel from a drop center rim by folding a portion of the rim radially inwardly to form a wheel mounting flange.

A still further object of this invention is to provide a novel process for making a vehicle wheel from a drop center rim by collapsing a portion of the rim into a radially extending flange.

A still further object of this invention is to provide a novel process for making a vehicle wheel from a rim by a single pressing operation.

The novel features which I believe to be characteristic of my invention are set forth with particularity in the appended claims. My invention itself, however, both as to its organization and method of operation, together with further objects and advantages thereof, may best be understood by reference to the following description, taken in connection with the accompanying drawings, in which:

Figure 1 is a side elevational view of a wheel constructed in accordance with the teachings of this invention;

Figure 2 is a front elevational view, partly in cross section of the wheel illustrated in Figure 1;

Figure 3 is a cross-sectional view of a vehicle rim as assembled in the die press prior to the collapsing step of the process;

Figure 4 is a cross-sectional view of the rim in the press taken along the line IV—IV of Figure 3;

Figure 5 is a cross-sectional elevational view of the left-hand portion of the rim and press after the collapsing step of the process has been completed;

Figure 6 is an elevational view of a piece of sheet material rolled into a circular article from which a rim is to be pressed, and Figure 7 illustrates a slight modification of the collapsed portion of the rim.

Referring now to Figures 1 and 2 of the drawings, I have illustrated therein one form of wheel which may be fabricated by the wheel manufacturing process presently to be described. The wheel shown in Figure 1 includes the usual rim part 1, and a radially extending depending flange 2. Flange 2 is provided with an annular series of apertures 3, through which the usual wheel mounting bolts are adapted to be inserted. The outer end of each aperture may be countersunk as at 4, if desired.

As may be seen best in Figure 2, rim 1 includes a base flange 5, opposite side flanges 6, opposite intermediate flanges 7, and opposite edge portions 8. As may be observed, fastening flange 2 extends radially inwardly from base flange 5 of rim 1 and is integral therewith. More precisely, a portion of base flange 5 is bent radially inwardly as at 9 and then radially outwardly as at 10. Portions 9 and 10 are illustrated as being disposed in intimate contact with each other, although it will readily be understood that this is not a defining limitation inherent in this invention. Obviously, the portions 9 and 10 may be spaced or partially spaced from each other without departing from the spirit and scope of this invention.

A wheel supporting element, such for example as a brake drum, is shown at 11. The supporting element 11 is provided with a plurality of circumferentially disposed mounting bolts 12 which are adapted to be inserted through apertures 3 of fastening flange 2. Cooperating with the mounting bolts 12 is a plurality of nuts 13 having tapered inner ends which are adapted to snugly seat in the countersunk portions 4 of flange 2.

To assemble the wheel on the supporting element 11, fastening flange 2 of rim 1 is moved into engagement with the mounting bolts 12. The nuts 13 are screwed into place and the wheel is then in its assembled operative position.

My novel process for manufacturing vehicle wheels from a single sheet of metal will now be described in detail, reference being had to Figures 3, 4, 5 and 6 of the drawings.

The first step of the process is to form a rectangular sheet of material 31 into a circular article such as that illustrated in Fig. 6. Opposite ends of sheet 31 are secured together in any suitable manner such for example, as by flash welding them, as is indicated at 32. When welding is employed, the surface of the weld is preferably reduced by grinding or the like to provide a smooth surface over the circular article.

The second step of the process is to stamp a rim 14, having a cross-sectional configuration as shown in Figure 3 from circular article 31. Rim 14 includes a base flange 15, opposite side flanges 16, opposite intermediate flanges 17 and opposite edge portions 18. Base flange 15 as preformed includes an axially extending portion 19 and a slightly depressed portion 20. It is to be understood that rim 14 may be preformed by any process well known or commonly employed by wheel manufacturers, since the precise preforming process forms no part of this invention.

The die press in which the second step of the process takes place includes an inner male die member 21, an outer female member 22, an inner male die member 23, and an outer female die member 24. Die members 21, 22, 23 and 24 have rim engaging surfaces which correspond to the varying configuration of rim 14, as may be seen in Figure 3.

Male die member 21 may be composed of a single block of material, but as will be obvious to those skilled in the art, the outer female die must comprise a plurality of members in order that it may be assembled and disassembled over rim 14. In Figure 4, I have shown female die 22 comprising four die sections 25, 26, 27 and 28. Since the manner of clamping die sections 25, 26, 27 and 28 forms no part of the present invention, no particular clamping means has been illustrated, but it will be understood that some suitable means will be employed to hold these sections in their desired position in the press.

Similarly, male die member 23 may be composed of a single block of material, but female die 24 comprises a similar set of die sections as that employed for the outer female die 22.

To form a wheel fastening flange on preformed rim 14, the rim is placed over the male die member 21 and the outer female die 22 is then moved into position as shown in Figure 3 and clamped into place. Male die member 23 is then moved into position as shown in Figure 3 and the outer die 24 is clamped into position. Outer die member 24 is provided with an inner lip 29 which is not provided on the corresponding female die 22.

As will be appreciated by those skilled in the art, lip 29 will cause the metal in base flange 15 to roll along the surface of male die member 23 when axial pressure is applied in the die press. Due to the fact that a portion of base flange 15 is depressed as at 20 and due to the above referred to action of lip 29, a portion of base flange 15 will be collapsed into a radially extending flange 2 from the application of pressure to rim 14 in the die press.

The portion of the various members at the end of the collapsing operation as well as the precise form of rim 14 is shown in Figure 5 of the drawings. The laterally extending portion 19 of base flange 15 now assumes the position of the ordinary base flange of a typical drop center rim. The drop center rim described above, however, is unique in that it is provided with an integral depending flange which extends radially inwardly and which may be used to mount the rim directly to the usual wheel supporting element, such as the brake drum on an automobile.

The final step of the process is to cut an annular series of apertures in radial flange 2 through which the usual wheel mounting bolts may be inserted.

A modification of my invention is illustrated in Fig. 7. In collapsing a radial flange from the base portion of a drop center rim, it is sometimes desirable to avoid too abrupt a bending of the material. In Fig. 7, the radial flange 2 collapsed from base portion 5 of a drop center rim, is bent at its inner edge to form an annular bead 33.

The points on portions 9 and 10 of flange 2 which are adjacent base flange 5 may be welded together if desired in order to prevent a separation of portions 9 and 10 under stress.

From the above description, it will be seen that I have provided an entirely new and novel method for manufacturing wheels. Its extreme simplicity and economy of manufacture is self-evident. Many variations in the details of construction, of course, will occur to those skilled in the art. For example, the radially extending flange 2 of Figure 1 or the radial flange 2 of Figure 5 may be collapsed from any other portion of the rim, other than that shown in the drawings without departing from the spirit and scope of this invention. Although I have shown the flange as extending from the inner edge of the base flange, it may extend from a central portion of the base flange or even from the outer edge thereof, and still be employed with equal success. Having taught the art, by my above description, the process of making wheels by collapsing or bending a radial fastening flange from a portion of the base flange of a drop center rim, many modifications of the manner in which this radial flange is collapsed will at once suggest themselves to the wheel manufacturing engineer.

While I have shown a particular embodiment of my invention, it will of course be understood that I do not wish to be limited thereto, since many modifications may be made and I therefore contemplate by the appended claims to cover all such modifications as fall within the true spirit and scope of my invention.

I claim as my invention:

1. The process of making a vehicle wheel from a drop center rim which includes preforming a drop center rim having a base flange slightly depressed at a point intermediate its edges, and applying axial compressing pressure to the entire rim to collapse only the depressed portion of said base flange.

2. The process of making a vehicle wheel from a drop center rim which includes preforming a drop center rim with the base flange wider than that desired for the wheel to be fabricated, then intimately engaging and holding the inner and outer surfaces of the side walls of said rim and a portion of the base flange of said rim, and causing an axial compression force to be applied to the rim to compress said rim axially whereby the portion of said base flange which lies between said held walls of said rim is collapsed.

3. The process of making a vehicle wheel from a drop center rim which includes forming a drop center rim including side flanges and a base flange wider than that desired in the wheel to be fabricated, intimately embracing and holding each of the side flanges about its entire circumference, and then applying an axial pressure to said rim to collapse an intermediate portion of said base flange between the held side flanges thereby providing a wheel body part with a tire rim part thereabout.

GEORGE ALBERT LYON.